Patented Nov. 9, 1948

2,453,655

UNITED STATES PATENT OFFICE 2,453,655

VINYL CARBOXYLATE POLYMERIZATION USING A THIOUREA STOPPER

Harold W. Bryant, Kenmore, N. Y., assignor to E. I. du Pont de Nemours & Company, Wilmington, Del., a corporation of Delaware No Drawing. Application January 8, 1948, Serial No. 1,269

15 Claims. (Cl. 260—87)

1

This invention relates to the polymerization of vinyl acetate and other vinyl esters of carboxylic acids, hereinafter referred to as vinyl carboxylates.

A continuous process for the polymerization of vinyl acetate is desirable, not only because of savings in time and labor but because generally a continuous process facilitates production of a product of uniform quality. For example, in the polymerization of vinyl acetate an important property of the polymer is its viscosity, which generally is expressed as the viscosity in centipoises of a benzol solution containing 86 grams per liter of the polymer. The viscosity of the polymer depends to a large measure on the conditions maintained during the polymerization and the extent of polymerization. In a continuous process it is relatively easy to maintain substantially constant conditions such as temperature and catalyst concentration in the polymerizing vessel. It is also easy to maintain constant the extent of polymerization therein by control of the continuous input of monomer and continuous removal of a mixture of the polymerizing material and removing therefrom the unpolymerized monomer. However, in carrying out such a continuous process, considerable difficulty has been experienced in obtaining a uniform product. This difficulty has been found to be due to the fact that after removal of the monomer-polymer mixture from the reactor, considerable further polymerization tends to occur prior to and during the operation of separating unpolymerized monomer from the polymer.

An object of the present invention is to provide a new and improved process for the polymerization of vinyl carboxylates. A further object is to provide a means for controlling the extent of polymerization and resulting properties of the polymer in the polymerization of vinyl carboxylates. Another object is to provide an improved continuous process for the polymerization of vinyl carboxylates. Still other objects of the invention will be apparent from the ensuing description.

In operating a continuous process for the polymerization of a vinyl carboxylate wherein a mixture of polymer and unpolymerized monomer is continuously removed from the polymerizing vessel in accordance with the present invention, I add to the effluent a thiourea of the type hereinafter described in such quantity as to substantially completely stop any further polymerization. The mixture to which the thiourea has thus been added then may be treated in any desirable manner to remove the unpolymerized vinyl carboxylate.

Thioureas suitable for practicing the invention include, in addition to thiourea itself, alkylated and arylated thioureas, i. e., monoalkyl, dialkyl, monoaryl, diaryl and alkyl aryl thioureas. In other words, a suitable thiourea will have the formula

wherein R and R' represent hydrogen, alkyl and aryl. Examples of suitable thioureas are thiourea, monomethyl thiourea, diethyl thiourea, dipropyl thiourea, monopropyl thiourea, dibutyl thiourea, monoamyl thiourea, monophenyl thiourea, methyl phenyl thiourea, thiocarbanilide and mononaphthyl thiourea.

In one method of practicing the invention, a quantity of monomeric vinyl acetate is placed in a closed tank equipped with an efficient agitator and a suitable quantity of a peroxide catalyst such as benzoyl peroxide is added and thoroughly mixed with the monomer. By means of suitable heating means the temperature of the mixture is maintained at reflux 73° C. ± 1°. Vinyl acetate and catalyst are then continuously added to the polymerizing vessel in constant proportion with continuous agitation and the resulting mixture of unpolymerized vinyl acetate and polymer is continuously withdrawn. Close to the point of withdrawal thiourea is continuously added to the stream of the monomer-polymer mixture leaving the polymerizer. This may conveniently be done by adding solution of thiourea in a suitable solvent such as the monomer or methanol. The amount of thiourea added should be so proportioned as to substantially completely stop polymerization. Generally the amount required is from .01 to 0.2% by weight of the combined vinyl acetate monomer and polymer content of the effluent. I prefer to use the smallest amount that will stop the reaction and to avoid a large excess of the thiourea. Excess thiourea sometimes results in the formation of elemental sulfur in subsequent operations, contaminating equipment and products. The minimum amount will depend upon polymerization conditions such as the nature of the catalyst employed and catalyst and monomer concentrations.

After adding the thiourea the effluent stream is pumped or otherwise caused to flow to a distillation column, into the bottom of which is added hot methanol vapor. This results in stripping out the monomer, combined methanol and monomer vapors leaving the top of the column while a solution of vinyl acetate polymer in methanol is removed from the bottom of the column. The methanol and monomer binary may be extracted if desired to remove methanol. The resulting monomer, which may contain 1 to 10% of methanol may be recycled to the polymerizer.

In carrying out this process, a solvent for the monomer and polymer such as methanol, methyl acetate, ethyl acetate, benzene or acetone may be utilized in the polymerizer as desired, depending upon the quality of polymer desired. Alternatively, the polymerization may be carried out in the presence of little or no added solvent.

This method of operation has been found to facilitate the production of a polymer of uniform properties such as viscosity when continued over extended periods of time. By completely arresting polymerization in the material leaving the polymerizer, the viscosity and other properties of the polymer are determined solely by the conditions of operation within the polymerizer, which are relatively easy to control.

My invention is not restricted to continuous polymerization operations but likewise may be utilized in other methods for polymerizing vinyl carboxylates, e. g., in solvent polymerization, in polymerization in aqueous dispersions for the production of granular polymers or polymer emulsions, or in "massive" polymerization wherein the monomer is polymerized substantially without dilution by solvent or of non-miscible liquids. In commercial operations of these various types, it seldom is profitable to continue the reaction until the monomer is completely polymerized, because as polymerization nears completion the speed of polymerization is greatly decreased. Therefore, in the production of so-called completely polymerized grades of polyvinyl carboxylates the practice generally is to remove unpolymerized material from the polymer after from 90 to 99% of the monomer has been polymerized. However, during the operation of removing unpolymerized monomer, whether or not this entails removing the reaction mixture from the polymerizing vessel, more or less polymerization usually will occur. In the practice of the present invention, when the polymerization has been continued to the desired extent, sufficient of a thiourea of the type described above is rapidly stirred into the reaction mixture, thus practically instantaneously stopping the polymerization and preventing residual monomer from polymerizing before it has been removed from the polymer. The minimum amount of the thiourea required to stop the reaction will depend mainly on the species of thiourea employed and to some extent on polymerization reaction conditions. Generally a sufficient quantity will be from 0.01 to 0.2% by weight of the total polymer and monomer present.

This method is particularly advantageous for granular polymerization of vinyl acetate to produce a polymer having uniform properties from batch to batch. Such granular polymerizations generally are carried out by dispersing the monomer in water with a limited amount of a suitable dispersing agent such as polyvinyl alcohol, adding a catalyst such as benzoyl peroxide and stirring the dispersion at a temperature of about 60 to 100° C. In this operation, the polymerizer is equipped with a reflux condenser and, as the monomer disappears through polymerization, the temperature of the dispersion gradually rises. Because of this fact, the extent of the polymerization may be determined by noting the temperature of the reaction mixture. Therefore in carrying out my invention to practice a granular polymerization of this type, I add the thiourea to stop the polymerization when the temperature has risen to a point indicating the desired extent of polymerization has occurred. The amount of thiourea required to be added is the same as in the above described continuous process, namely about 0.01 to 0.2% of the total weight of monomer and polymer present.

Residual monomer may be removed for example by steam distillation from the reaction mixture. The steaming operation may be carried out immediately by passing steam into the reaction mixture in the polymerizing vessel or the desired reaction mixture may be transferred to other equipment for the steaming operation, as desired.

The following examples still further illustrate my invention:

Example I

A continuous polymerization process was carried out by continually flowing vinyl acetate monomer and a polymerization catalyst into a vessel fitted with a reflux condenser, temperature control means and a stirrer, and continuously removing therefrom a mixture of polymer and monomer. The rate of monomer feed and product removal were maintained at substantially equal and constant rates to effect a retention time of approximately 2 hours, and the reaction mixture was continuously agitated to obtain uniform conditions throughout the reaction mass. The temperature was maintained substantially constant at approximately 72° C.

The effluent from the polymerizing vessel, containing 20 to 25% by weight of polymer, was passed continuously through a distilling "stripping" column where the monomer was continuously distilled off by means of methanol vapor and the polymer was collected as a methanol solution. A continuous stream of a 1% solution of thiourea in methanol was continuously fed into the stream of polymer-monomer mixture leaving the polymerizing vessel on its way to the distilling column.

Twice daily samples were taken (a) of the effluent from the polymerizing vessel and (b) of the polymer solution flowing from the distilling column. A further quantity of thiourea was added to the samples, which also were cooled, thus insuring against any further polymerization. Each sample was poured into cold water to precipitate polymer, which was dried, dissolved to one molar (86 g. per liter) concentration in benzene and the viscosity of the benzene solution measured.

The viscosities obtained are tabulated below:

| Day | Time | Viscosity | |
|---|---|---|---|
| | | (a) Polymerizer Sample | (b) Stripping Column Sample |
| 1 | 8:00 a. m. | 178 | 167 |
| 1 | 8:00 p. m. | 151 | 158 |
| 2 | 8:00 a. m. | 233 | 214 |
| 2 | 8:00 p. m. | 230 | 214 |
| 3 | 8:00 a. m. | 223 | 235 |
| 3 | 8:00 p. m. | 220 | 222 |

In operating the same process, but without addition of thiourea, the viscosity of the product from the stripping column generally exceeded that of the polymerizer effluent by 50% or more and at times caused plugging of the stripping column. When thiourea was employed as above described, there was no evidence of plugging of the stripping column.

Example II

For the preparation of granular polyvinyl acetate, the following materials (in parts by weight)

were placed in a jacketed stainless steel vessel equipped with a conventional mechanical stirrer and a reflux condenser.

| | Parts |
|---|---|
| Vinyl acetate | 100 |
| Water | 61.16 |
| Benzoyl peroxide | 0.1 |
| Polyvinyl alcohol | 0.0146 |

The mixture was continuously stirred at a rate sufficient to form a dispersion of vinyl acetate globules in the water, the polyvinyl alcohol aiding this dispersion. Heat was applied by injecting steam into the stirred mixture to raise it to refluxing temperature (65° C.). With continued stirring, the mixture was maintained at reflux temperature, by heating or cooling as required, heating by steam injection and cooling by circulating water through the jacket. As polymerization proceeded, the reflux temperature gradually rose; when it reached 76° C., an amount of thiourea equal to 0.03% of the original weight of vinyl acetate was added. After several minutes thereafter, residual vinyl acetate monomer was removed by steam distillation, leaving polyvinyl acetate granules and water. The granules were removed from the water by centrifuging and dried in conventional manner.

A large number of runs were made utilizing the above procedure, and the results were compared with runs made by the same procedure, but without the addition of thiourea. The viscosities of the resulting polyvinyl acetate were:

| | Thiourea added | Thiourea not added |
|---|---|---|
| Viscosity | Cp. 350 to 475 | Cp. 1,300 to 2,000 |

*Example III*

The following materials were placed in a 1-liter, 3-necked balloon flask provided with a ground glass, jointed reflux condenser, water-sealed stirrer and a thermometer well.

| | | |
|---|---|---|
| Vinyl acetate | g | 300 |
| Water | g | 300 |
| Polyvinyl alcohol 5% sol'n | ml | 2 |

The flask was placed in a steam heated water bath, the stirring motor was connected and the mixture was stirred mildly. The bath temperature was rapidly increased to a temperature (about 70°) such that the water vinyl acetate mixture was just refluxing (65° C.). To the mixture was then added 0.2 g. benzoyl peroxide. The bath temperature was then adjusted so as to maintain constant reflux. An additional 1-3 ml. of the polyvinyl alcohol solution was added in 1 ml. increments as required to maintain the polymer in granular form until the reflux temperature of the reaction mixture reached 80° C. (about 90% of the vinyl acetate polymerized), whereupon 0.3 g. of dibutyl thiourea was added. The reflux condenser was then removed and steam was injected into the system for about 15 minutes. The temperature of the reaction mixture gradually increased to 98–100° C. as the residual monomer was removed. The mixture was then cooled with continued stirring. The polymer beads were separated by filtration and were dried.

The viscosity of a molar benzene solution of the polyvinyl acetate was measured at 20° C. using a Hoeppler viscosimeter and found to be 850 centipoises.

While my invention has been described with reference to the polymerization of vinyl acetate it is not restricted thereto but is likewise applicable to the polymerization of other vinyl carboxylates, for examples, the vinyl esters of formic, propionic, butyric, stearic, and oleic acids. The invention also may be utilized in the copolymerization of such vinyl esters with other vinyl compounds or other polymerizable materials, particularly when the vinyl ester is in predominating proportion in such copolymerization.

My invention may be utilized in polymerization operations employing various known polymerization techniques and conditions and utilizing various known catalysts for vinyl esters polymerization. Generally I prefer to utilize an organic peroxide as the polymerization catalyst, for example, benzoyl peroxide, acetyl peroxide or other acyl peroxide at a reaction temperature lying between 20° C. and the boiling point of the monomer. Also suitable as polymerization catalysts in practicing my invention are other organic peroxides such as organic peracids and alkyl hydroperoxides. Persulfates and hydrogen peroxide also may be used.

I claim:

1. In a vinyl carboxylate polymerization process, the method for controlling the properties of the polymeric product which comprises stopping the polymerization reaction at a predetermined extent of polymerization by adding thereto a thiourea having the formula

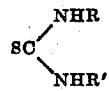

where R and R' represent a radical selected from the group consisting of hydrogen, alkyl and aryl.

2. In a process for the polymerization of a vinyl carboxylate, the step which comprises adding to the polymerization reaction before polymerization is completed, a thiourea having the formula

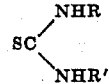

where R and R' represent a radical selected from the group consisting of hydrogen, alkyl and aryl, in an amount sufficient to substantially completely stop polymerization and thereafter separating unpolymerized monomer from the resulting polymer.

3. In a process for the polymerization of vinyl acetate, the step which comprises adding to the polymerization reaction before polymerization is completed, a thiourea having the formula

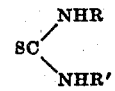

where R and R' represent a radical selected from the group consisting of hydrogen, alkyl and aryl, in an amount sufficient to substantially completely stop polymerization and thereafter separating unpolymerized monomer from the resulting polymer.

4. The process according to claim 3 in which said thiourea is thiourea $(SC(NH_2)_2)$.

5. The process according to claim 3 in which said thiourea is thiocarbanilide.

6. The process according to claim 3 in which said thiourea is dibutyl thiourea.

7. A polymerization process which comprises mixing a vinyl carboxylate monomer with a polymerization catalyst, maintaining the mixture at a temperature between about 20° C. and the boiling point of said monomer at the existing pressure until polymerization has proceeded to a predetermined extent less than complete polymerization, and then adding thereto a thiourea having the formula

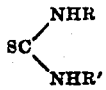

where R and R' represent a radical selected from the group consisting of hydrogen, alkyl and aryl in an amount sufficient to substantially completely stop the polymerization.

8. A polymerization process which comprises stirring vinyl acetate monomer with water and a polymerization catalyst comprising an acyl peroxide, maintaining the mixture at a temperature between about 20° C. and the boiling point of said monomer at the existing pressure until polymerization has proceeded to a predetermined extent less than complete polymerization, then adding thereto thiourea in an amount sufficient to substantially completely stop the polymerization, and separating monomer from the resulting polymer.

9. A polymerization process which comprises stirring vinyl acetate monomer with water and a polymerization catalyst comprising an acyl peroxide, maintaining the mixture at a temperature between about 20° C. and the boiling point of said monomer at the existing pressure until polymerization has proceeded to a predetermined extent less than complete polymerization, then adding thereto thiocarbanilide in an amount sufficient to substantially completely stop the polymerization, and separating monomer from the resulting polymer.

10. A polymerization process which comprises stirring a vinyl acetate monomer with water and a polymerization catalyst comprising an acyl peroxide, maintaining the mixture at a temperature between about 20° C. and the boiling point of said monomer at the existing pressure until polymerization has proceeded to a predetermined extent less than complete polymerization, then adding thereto dibutyl thiourea in an amount sufficient to substantially completely stop the polymerization and removing monomer from the resulting polymer.

11. A continuous process for polymerizing a vinyl carboxylate which comprises continuously adding vinyl carboxylate monomer and a polymerization catalyst to a body of the same maintained at a temperature favoring polymerization, continuously withdrawing therefrom a mixture of said monomer and resulting polymer and continuously adding to the effluent stream of said mixture a thiourea having the formula

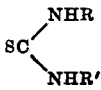

when R and R' represent a radical selected from the group consisting of hydrogen, alkyl and aryl, in an amount sufficient to substantially completely stop polymerization in said stream and thereafter separating monomer from said stream.

12. A continuous process for polymerizing vinyl acetate which comprises continuously adding vinyl acetate monomer and a polymerization catalyst comprising an organic peroxide to a body of the same maintained at a temperature between about 20° C. and the boiling point of said monomer at the existing pressure, continuously withdrawing therefrom a mixture of said monomer and resulting polymer and continuously adding to the effluent stream of said mixture a thiourea having the formula

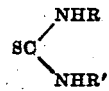

when R and R' represent a radical selected from the group consisting of hydrogen, alkyl and aryl in an amount sufficient to substantially completely stop polymerization in said stream and thereafter separating monomer from said stream.

13. A continuous process for polymerizing vinyl acetate which comprises continuously adding vinyl acetate monomer and benzoyl peroxide to a body of the same maintained at a temperature between about 20° C. and the boiling point of said monomer at the existing pressure, continuously withdrawing therefrom a mixture of said monomer and resulting polymer and continuously adding to the effluent stream of said mixture thiourea in an amount sufficient to substantially completely stop polymerization in said stream and thereafter separating monomer from said stream.

14. A continuous process for polymerizing vinyl acetate which comprises continuously adding vinyl acetate monomer and a polymerization catalyst comprising benzoyl peroxide to a body of the same maintained at a temperature between about 20° C. and the boiling point of said monomer at the existing pressure, continuously withdrawing therefrom a mixture of said monomer and resulting polymer and continuously adding to the effluent stream of said mixture thiocarbanilide in an amount sufficient to substantially completely stop polymerization in said stream and thereafter separating monomer from said stream.

15. A continuous process for polymerizing vinyl acetate which comprises continuously adding vinyl acetate monomer and a polymerization catalyst comprising benzoyl peroxide to a body of the same maintained at a temperature between about 20° C. and the boiling point of said monomer at the existing pressure, continuously withdrawing therefrom a mixture of said monomer and resulting polymer and continuously adding to the effluent stream of said mixture dibutyl thiourea in an amount sufficient to substantially completely stop polymerization in said stream and thereafter separating monomer from said stream.

HAROLD W. BRYANT.

No references cited.